United States Patent
Thomas et al.

(10) Patent No.: US 6,987,819 B2
(45) Date of Patent: Jan. 17, 2006

(54) METHOD AND DEVICE FOR MULTIPLE INPUT/MULTIPLE OUTPUT TRANSMIT AND RECEIVE WEIGHTS FOR EQUAL-RATE DATA STREAMS

(75) Inventors: Timothy A. Thomas, Palatine, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 878 days.

(21) Appl. No.: 09/990,704

(22) Filed: Nov. 13, 2001

(65) Prior Publication Data

US 2002/0118781 A1 Aug. 29, 2002

Related U.S. Application Data

(60) Provisional application No. 60/259,039, filed on Dec. 29, 2000.

(51) Int. Cl.
*H03D 1/00* (2006.01)
*H04L 27/06* (2006.01)

(52) U.S. Cl. .............................. 375/342; 375/316
(58) Field of Classification Search ............. 375/342, 375/316, 299, 349, 347, 348; 455/522, 69, 455/62, 63, 562.1, 63.4
See application file for complete search history.

(56) References Cited

U.S. PATENT DOCUMENTS

| | | | | |
|---|---|---|---|---|
| 6,463,295 | B1 * | 10/2002 | Yun | 455/522 |
| 6,665,545 | B1 * | 12/2003 | Raleigh et al. | 455/562.1 |
| 6,778,612 | B1 * | 8/2004 | Lozano et al. | 375/299 |
| 6,834,043 | B1 * | 12/2004 | Vook et al. | 370/310 |
| 2002/0027985 | A1 * | 3/2002 | Rashid-Farrokhi | 379/417 |

OTHER PUBLICATIONS

H. Sampath and A. Paulraj, "Joint Transmit and Receive Optimization for High Data Rate Wireless Communica-tion Using Multiple Antennas," Proc. of Assilomar 1999, Monterey, California, Nov., 1999.

G. Raleigh and J. Cioffi, "Spatio-Temporal Coding for Wireless Communication," IEEE Transactions on Communications, vol. 46, No. 3, pp. 357-366, Mar. 1998.

* cited by examiner

*Primary Examiner*—Khai Tran

(57) ABSTRACT

The invention provides a method of operating a communication system. A channel matrix of a gain and phase between each transmit antenna and each receive antenna of the communication system is provided. At least one receive weight vector is computed as a function of the channel matrix and at least one of transmit weight vectors. An updated transmit weight vector is computed as a function of the transmit weight vector, the receive weight vector, the channel matrix.

20 Claims, 10 Drawing Sheets

METHOD AND DEVICE FOR MULTIPLE INPUT/MULTIPLE OUTPUT TRANSMIT AND RECEIVE WEIGHTS FOR EQUAL-RATE DATA STREAMS

This application claims the benefit of provisional application 60/259,039 filed on Dec. 29, 2000.

FIELD OF THE INVENTION

In general, the invention relates to the field of communication systems. More specifically, the invention relates to strategies for wireless Multiple-Input/Multiple-Output (MIMO) communications and in particular, to establishing transmit and receive weighting matrices for use at the transmitter antenna array and the receiver antenna array.

BACKGROUND OF THE INVENTION

In a wireless communication system, a major design challenge is to maximize system capacity and performance. One such communication design known in the art is Multiple-Input/Multiple Output (MIMO), and is a means of transmitting multiple data streams on the same time-frequency channel to a single receiver. The MIMO strategy involves deploying multiple antennas on both the transmitter and the receiver.

In environments having rich multipath scattering, large increases in capacity can be achieved through the use of MIMO and appropriate transmit and receive signal processing techniques. It is well known that MIMO wireless channels have significantly higher capacities than single-input single-output wireless communication channels, which has motivated the design of wireless communication systems with multiple antennas. Current system algorithms designed to achieve high capacity include spatial multiplexing, space-time coding and adaptive modulation.

These MIMO systems include the various BLAST (Bell-labs LAyered Space-Time) type techniques proposed by Lucent as a subset. The BLAST type techniques however, do not use the channel knowledge at the transmitter and thus are sub-optimal.

For MIMO systems, the maximum theoretical system capacity can be achieved using transmit and receive weights based on the Singular Value Decomposition (SVD) combined with a water-pouring (optimally assigning power to the individual data streams) strategy for determining the optimal data rates and power distribution. This strategy for maximizing capacity must adaptively control not only the number of independent data streams to be formed but also the choice of modulation and coding to be used on each stream. However, even for full-rank channels (as are known in the art), there are cases where a fixed number of data streams having the same modulation type is desirable, for example to avoid having to make a complex real-time decision on both the number of streams and the modulation/coding type on each stream. Consequently, using the SVD weights for a fixed number of equal-rate data streams is not the best option because fixing the modulation type will not take advantage of the unequal signal-to-noise ratios at the outputs of the receive array.

Therefore, it would be desirable to have a method and device for finding transmit and receive weights that are optimized for the use of equal-rate data streams. Further, it would be desirable that these weights have a lower Bit Error Rate (BER) than weights found using the SVD approach.

DETAILED DESCRIPTION OF THE PRESENTLY PREFERRED EMBODIMENTS

Figure 1:
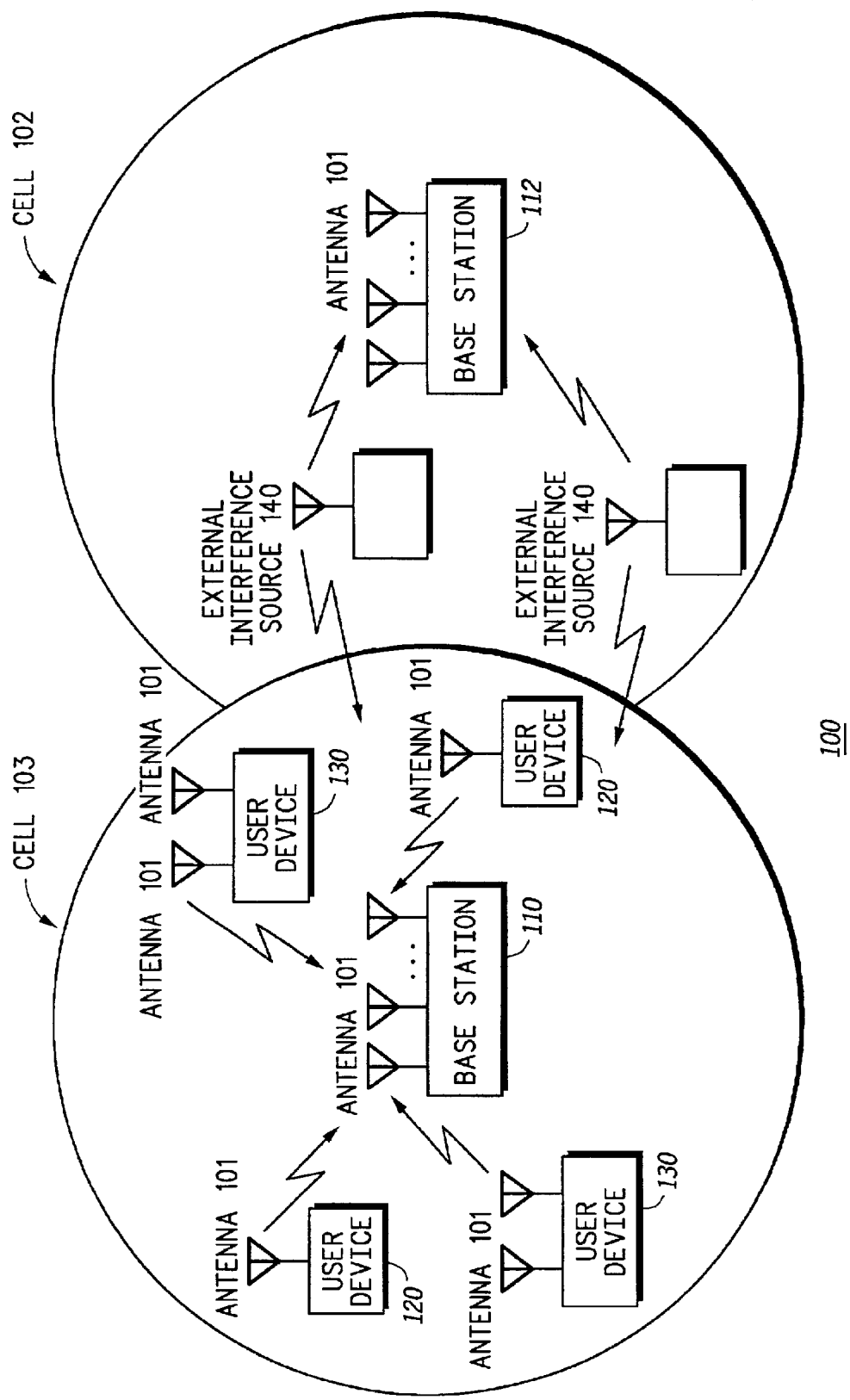
FIG. 1 is an overview diagram of a preferred embodiment of a wireless (cellular) communication system in accordance with the invention.

FIG. 1 illustrates a wireless communication system 100 in accordance with one embodiment of the present invention. As shown in FIG. 1, a base station 110 provides communication service to a geographic region known as a cell 103, 102. At least one user device 120 and 130 communicate with the base station 110. In one embodiment of the wireless communication system 100, at least zero external interference sources 140 share the same spectrum allocated to the base station 110 and subscriber devices 120 and 130. The external interference sources 140 represent an unwanted source of emissions that interferes with the communication process between the base station 110 and the user devices 120 and 130. The exact nature and number of the external interference sources 140 will depend on the specific embodiment of the wireless communication system 100. In the embodiment shown in FIG. 1, an external interference source will be another user device 140 (similar in construction and purpose to user device 120) that is communicating with another base station 112 in the same frequency spectrum allocated to base station 110 and user devices 120 and 130. As shown in FIG. 1, user devices 120 have a single transmit antenna 101, while user devices 130 have at least one antenna 101. One embodiment of the invention provides that the user devices 120 and 130, as well as the base station 110 may transmit, receive, or both from the at least one antenna 101. An example of this would be a typical cellular telephone. Additionally, one embodiment of the invention can be implemented as part of a base station 110 as well as part of a user device 120 or 130. Furthermore, one embodiment provides that user devices as well as base stations may be referred to as transmitting units, receiving units, transmitters, receivers, transceivers, or any like term known in the art, and alternative transmitters and receivers known in the art may be used.

Figure 2:
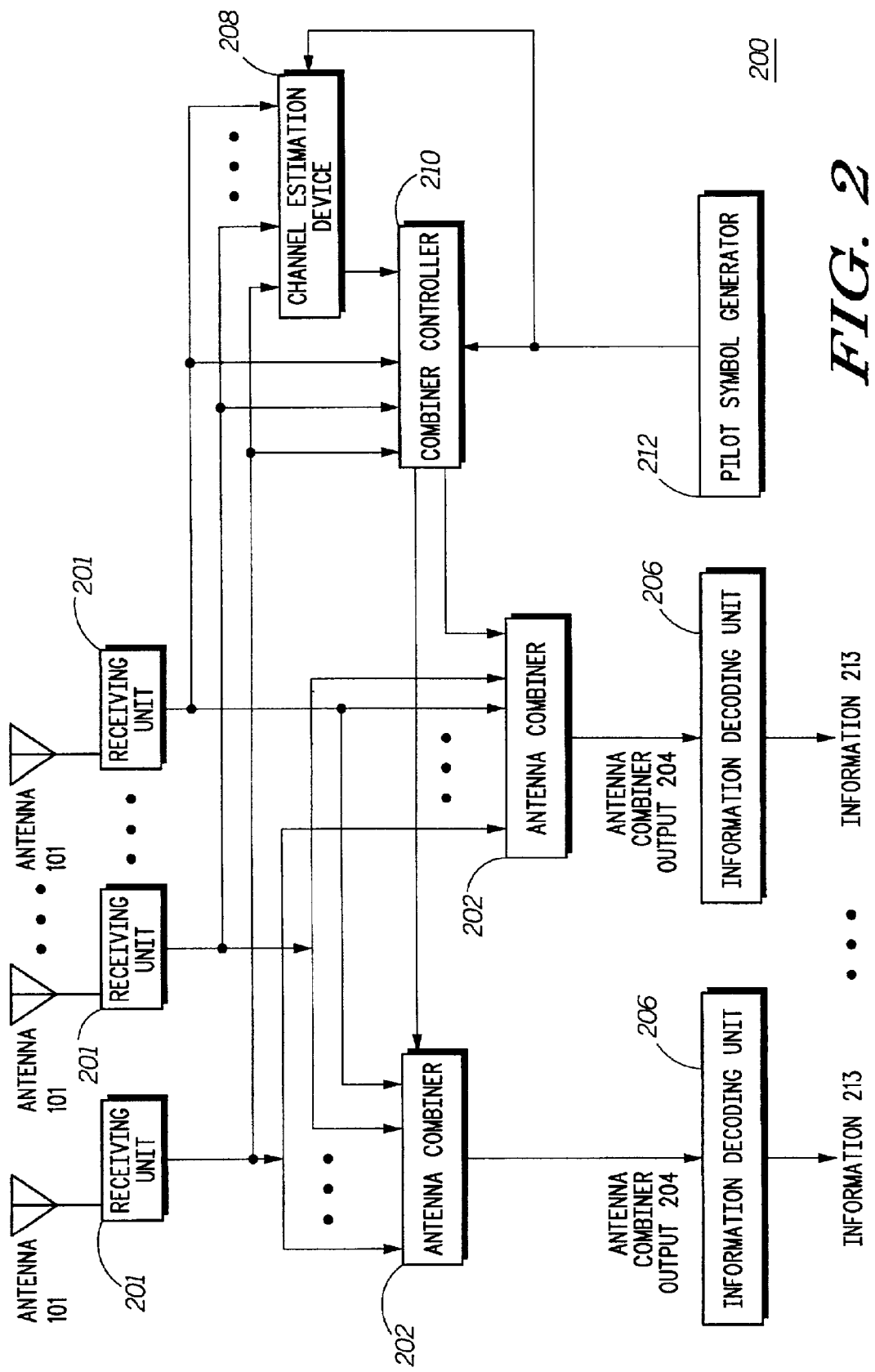
FIG. 2 is a block diagram illustrating a preferred embodiment of a receiving device imbedded within the communication system of FIG. 1 in accordance with the invention.

FIG. 2, is a block diagram illustrating one embodiment of a receiving device 200 imbedded within the wireless communication system 100 of FIG. 1, in accordance with the present invention. The receiving device 200 includes at least one antenna 101 wherein the outputs of the antennas are each provided to a receiving unit 201. The outputs of the receiving units 201 are provided to at least one antenna combiner 202. The signals from the receiving units 201 are also fed into a combiner controller 210, which may regulate the operation of the at least one antenna combiner 202. The signals from the receiving units 201 may also be fed into a channel estimation device 208. A pilot symbol generator 212 generates pilot symbol information that is used by the combiner controller 210 to control the antenna combiner 202. The pilot symbol information generated by the pilot symbol generator 212 is also used by the channel estimation device 208 to estimate a time-varying frequency response of the transmitting devices of wireless communication system. The output of the antenna combiner 202 is fed into an information decoding unit 206, which decodes the antenna combiner output 204 and generates data information 213 that was received by the antennas 101.

Figure 3:
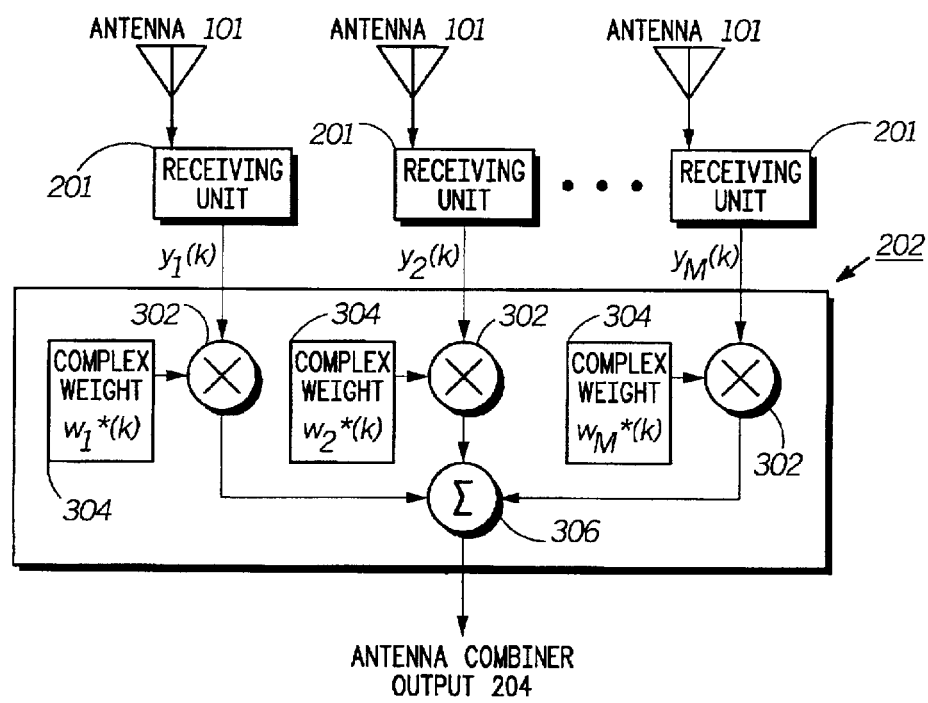
FIG. 3 is a block diagram illustrating details of an antenna combiner imbedded within the receiving device of FIG. 2 in accordance with the invention.

FIG. 3 is a block diagram illustrating details of the antenna combiner 202 of receiving device 200 of FIG. 2. In one embodiment, antenna combiner 202 can be coupled to the receiving units 201, which in turn are coupled to the antennas 101. The receiving units 201 may include radio frequency pre-amplifiers, filters, and other devices that can be used to convert a radio frequency signal received by the antenna 101, to a digital stream of baseband equivalent complex symbols. As illustrated in FIG. 2, the output (y) of the $i^{th}$ receiving unit 201 (where i is an integer between 1 and M inclusive, and M is the total number of antenna 101 elements) may be mathematically denoted by $y_i(k)$, where k and i are integers, and is provided to the antenna combiner 202. The antenna combiner 202 can be in the form of at least one complex multipliers 302 that multiply the output of each receiving unit 201 by a weight (w) 304 mathematically denoted as $w_i(k)$. A combiner 306 may sum the outputs of the at least one complex multipliers 302. For one embodiment of the invention, the combiner controller 210 of FIG. 2 controls the values of the weights 304.

Figure 3A:
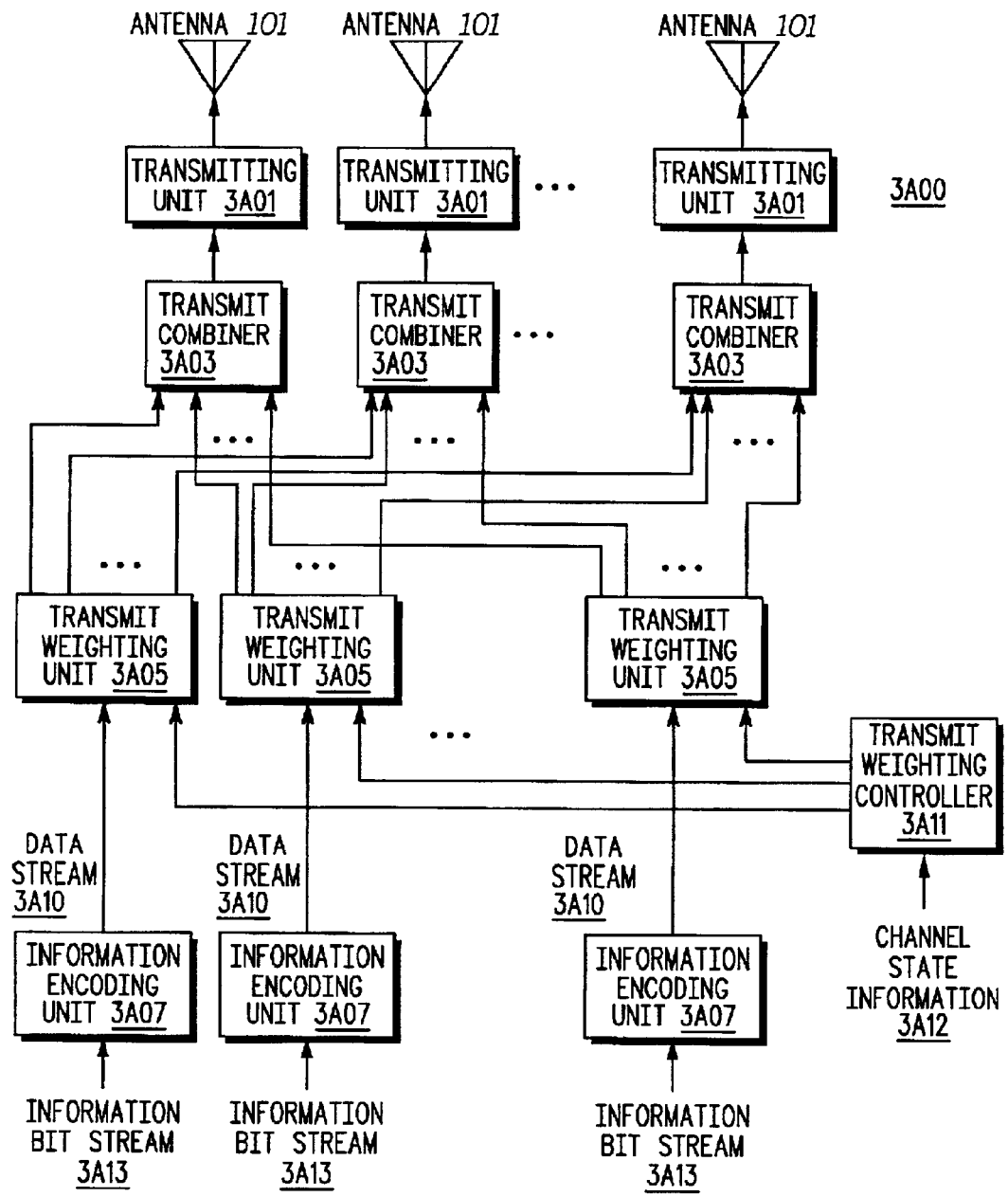
FIG. 3A is a block diagram illustrating a preferred embodiment of a transmitting device imbedded within the communication system of FIG. 1 in accordance with the invention.

FIG. 3A is a block diagram illustrating one embodiment of a transmitting device 3A00 imbedded within the wireless communication system 100 of FIG. 1, in accordance with the present invention. The transmitting device 3A00 may include at least one antenna 101 wherein the inputs to the antennas may be provided from at least one transmitting unit 3A01, and at least one transmit combiner 3A03. The inputs to the transmit combiner 3A03 may be provided from at least one transmit weighting unit 3A05. At least one Information Bit Stream 3A13 may be encoded by an Information Encoding Unit 3A07 and converted into a Data Stream 3A10. The Data Stream 3A10 is weighted by transmit weighting unit 3A05 and the outputs of the transmit weighting unit 3A05 may be sent to the transmit combiner 3A03. The Transmit Weighting Unit Controller 3A11 may be provided with channel state information 3A12, which may be used by the Transmit Weighting Unit Controller 3A10 to control the operation of transmit weighting units 3A05.

Figure 4:
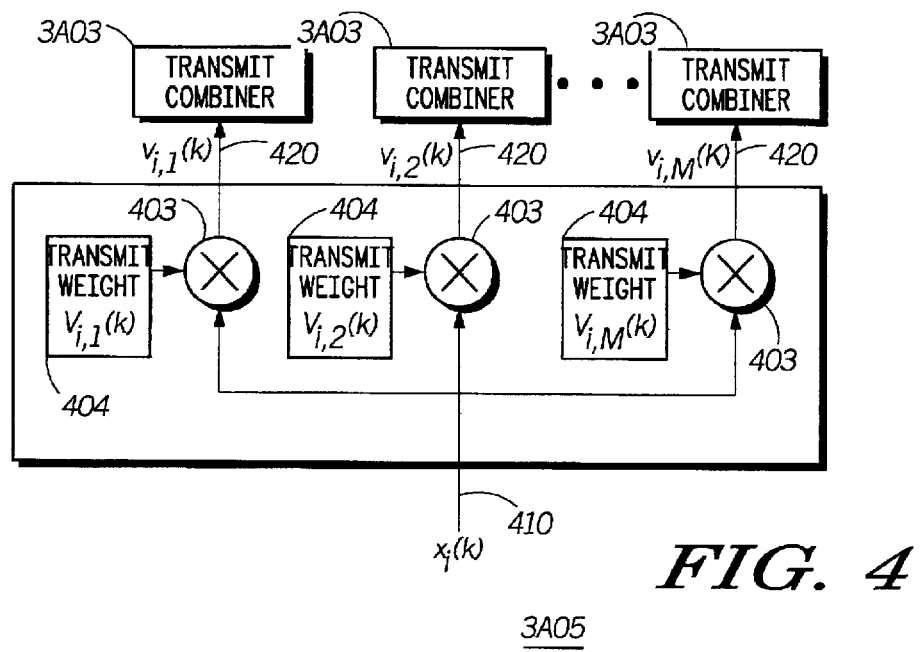
FIG. 4 is a block diagram illustrating one embodiment of a transmit weighting unit imbedded within the transmitting device of FIG. 3A in accordance with the invention.

FIG. 4 is a block diagram illustrating one embodiment of the transmitting weighting unit 3A05 of FIG. 3A, in accordance with the present invention. The symbol (x) on data stream i at time k, $x_i(k)$ 410 is weighted 403 by a transmit weight 404. The transmit weight 404 value may be dependant on which antenna the transmit weight 404 is associated with. In equation form, an antenna m's signal (v) for data stream i at time k 420 may be expressed as $v_{i,m}(k)=V_{i,m}(k) x_i(k)$. The antenna m's signal at time k for data stream i may be sent to the transmit combiner 3A03 for antenna m in order to combine all the data streams before radiating the signal out of antenna m.

Figure 5:
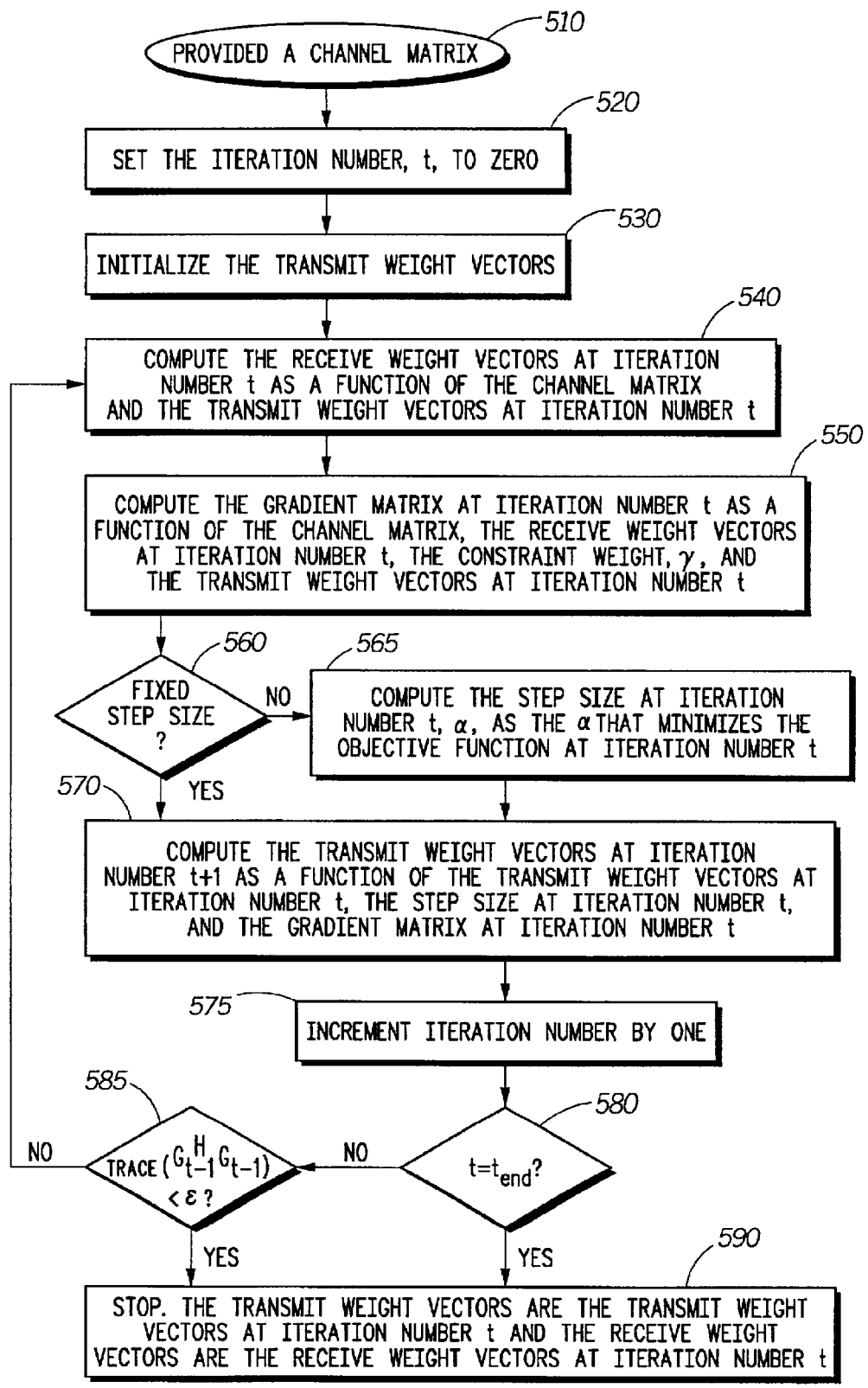
FIG. 5 is a flow chart representation of one embodiment of a method for providing Multiple Input Multiple Output (MIMO) receive and transmit weights as performed by the antenna combiner of FIG. 3 and transmitting device of FIG. 3A, for finding the MMSE linear weights, in accordance with the invention.

FIG. 5 is a flow chart representation of a method for providing multiple input multiple output MIMO receive weights as can be performed by the antenna combiner of FIG. 3, and the transmitting device 3A00, in accordance with the invention.

One embodiment of the invention may transmit and receive $N_s$ data streams, wherein each data stream can have the same modulation type with $M_T$ transmit antennas and $M_R$ receive antennas. The present invention may provide an alternative to the SVD weights that are known in the art. One embodiment of the present invention can minimize the mean square error between the receive array outputs and the transmitted symbols. Using the SVD weights for a fixed number of equal-rate data streams may not be the best option because fixing the modulation type will not take advantage of the unequal signal-to-noise ratios at the outputs of the receive array. This is because the SVD weights diagonalize the channel, which means that there is no cross talk between the data streams. Thus MMSE weights based on the SVD approach will not take advantage of the performance gains possible by trading off the suppression of other streams with gains over noise. Further, if the SVD weights are used while changing each streams' transmitted power so that each data stream is received with equal energy, the optimal data stream will be penalized while an inadequate data stream is built-up, again indicating that this is not the best solution. One embodiment of the present invention computes linear MMSE weights that are not constrained to diagonalize the channel, thereby providing superior performance when all data streams have the same modulation type.

In order to compute the linear MMSE weights in accordance with one embodiment of the present invention, a single estimate of the channel gain and phase between each receive antenna and each transmit antenna may be provided to the invention (this is also called the channel). The channel is modeled as stationary and flat-faded. As is known in the art, such channels occur in systems that include, but are not limited to, single carrier systems operating in frequency non-selective channels, OFDM systems in which an embodiment of the invention operates on a set of frequency-domain subcarriers having identical frequency response characteristics, or single carrier system in which an embodiment of the invention operates in the frequency domain on a set of frequency-bins having identical frequency response characteristics, or other similar systems as is known in the art. Also provided is that both the transmitting weighting unit and receiving device may know the channel.

In one embodiment, the $M_R \times M_T$ channel matrix, H, contains the gain and phase between each transmit and receive element. Also let the $M_T \times N_s$ matrix (also known as the transmit weighting matrix), V, denote the transmit weights for the $N_s$ streams (the $u^{th}$ column of V is denoted $v_u$), and finally let the $N_s \times 1$ vector, x, be the symbols on the $N_s$ streams (at one particular time). Then for this embodiment, a received $M_R \times 1$ vector can be given as:

$$y = HVx + n \quad (1)$$

where n is a $M_R \times 1$ vector of noise with power of $\sigma_n^2$ each of the received antennas. In one embodiment, in order to keep an average transmit power equal to one, the transmit weighting matrix may be normalized as follows:

$$\text{trace}(V^H V) = 1 \quad (2)$$

where trace(A) means the sum of the diagonal elements of the square matrix A.

One embodiment of the invention finds the transmit weighting matrix and a $M_R \times N_s$ receive weighting matrix, W, such that an estimate of the transmitted symbols, r, is:

$$r = W^H y \quad (3)$$

(The $u^{th}$ column of W is denoted $w_u$.) In one embodiment of the invention, the operation of the invention may be optimized for the case where each of the $N_s$ data streams is constrained to have the same modulation type. This embodiment of the invention minimizes the Mean Squared Error (MSE) between the estimated symbol on each stream and the transmitted symbol assuming linear receive and transmit weights. In equation form, this can be expressed as:

$$\min_{w_u, v_u} \sum_{u=1}^{N_s} E|r_u - x_u|^2 = \min_{w_u, v_u} \sum_{u=1}^{N_s} E\left|w_u^H \left(\sum_{l=1}^{N_s} Hv_l x_l + n\right) - x_u\right|^2 \quad (4)$$

where $r_u$ is the $u^{th}$ element of the vector r and $x_u$ is $u^{th}$ element of the vector x. Using $E\{x_u x_l^*\} = \delta(u-l)$, (4) becomes:

$$\min_{w_u, v_u} \left\{ \sum_{u=1}^{N_s} w_u^H \left(\sum_{l=1}^{N_s} Hv_l v_l^H H^H + \sigma_n^2 I_{M_R}\right) w_u - \sum_{u=1}^{N_s} w_u^H Hv_u - \sum_{u=1}^{N_s} v_u^H H^H w_u + N_s \right\} \quad (5)$$

In addition to the minimization of the objective function in (5), the constraints on the transmit weight vectors (the columns of the matrix V) given in (2) need to be met. One embodiment of the invention meets the constraints by modifying the objective function of (5) as follows:

$$\min_{w_u, v_u} \left\{ \sum_{u=1}^{N_s} w_u^H \left(\sum_{l=1}^{N_s} Hv_l v_l^H H^H + \sigma_n^2 I_{M_R}\right) w_u - \sum_{u=1}^{N_s} w_u^H Hv_u - \sum_{u=1}^{N_s} v_u^H H^H w_u + N_s + \gamma \left|\sum_{u=1}^{N_s} v_u^H v_u - 1\right|^2 \right\} \quad (6)$$

where $\gamma$ is an arbitrary scaling placed on the constraint part of the objective function.

A closed form solution to (6) does not exist for $N_s > 1$. However, (6) is in the form of an unconstrained optimization problem so a modified version of an iterative algorithm such as the gradient-based optimization approach is used by one embodiment of the invention to solve for $w_u$ and $v_u$. The gradient of (6) with respect to $w_u$ can be shown to be:

$$\nabla w_u = (HVV^H H^H + \sigma_n^2 I_{M_R}) w_u - Hv_u \quad (7)$$

Because $(HVV^H H^H + \sigma_n^2 I_{M_R})$ is well conditioned, its inverse can be found. Therefore W can be found at each iteration step as follows (i.e., by setting equation (7) equal to zero):

$$W = (HVV^H H^H + \sigma_n^2 I_{M_R})^{-1} HV \quad (8)$$

The gradient of (6) with respect to $v_u$ can be shown to be:

$$\nabla v_u = (H^H WW^H H + 2\gamma(\text{trace}(V^H V) - 1) I_{M_T}) v_u - H^H w_u \quad (9)$$

The invention lets $G = [\nabla v_1 \ldots \nabla v_{N_s}]$, and then using equation (9), G can be expressed as:

$$G = (H^H WW^H H + 2\gamma(\text{trace}(V^H V) - 1) I_{M_T}) V - H^H W \quad (10)$$

The above embodiment of the invention explicitly adds the constraint on the transmit weights in equation (2) to the minimization. Another option for ensuring the constraint is to use a Lagrangian multiplier, $\lambda$, as is known in the art. For this method, the gradient matrix in (10) is changed as follows:

$$G = (H^H WW^H H + \lambda I_{M_T}) V - H^H W \quad (11)$$

One addition gradient is needed, the Lagrangian gradient which is:

$$g_\lambda = \text{trace}(V^H V - 1) \quad (12)$$

The previous equations and calculations express a mathematical means for a method of providing linear MIMO transmit and receive weights.

The method of providing MIMO receive and transmit weights, shown in the flow chart 500, may begin by being provided a channel matrix 510. The channel matrix H, is a $M_R \times M_T$ matrix that contains the gain and phase between each transmit antenna ($M_T$ is the total number of transmit antennas) and each receive antenna ($M_R$ is the total number or receive antennas). In one embodiment of the invention, the received vector y, is modeled as $y(k) = HVx(k) + n(k)$, where V is a $M_T \times N_s$ matrix of the transmit weight vectors, $x(k)$ is a $N_s \times 1$ vector of the transmitted symbols at index k (e.g., time or frequency), and $n(k)$ is a $M_R \times 1$ vector of noise at index k. The embodiment of the invention illustrated in FIG. 5 may require the total transmit power to be limited, therefore the transmit weight vectors are constrained to $\text{trace}(V^H V) = 1$, where trace(A) means to sum the diagonal elements of the matrix A, and superscript H means the conjugate transpose (also known as the Hermitian) of the matrix.

Another embodiment of the invention may find a receive weighting matrix (also referred to as the receive weight vectors) W, that find an estimate, $r(k)$, of $x(k)$ as a function of $r(k) = W^H y(k)$. Next for the embodiment 500, block 520 initializes an iteration number t=0. In one embodiment of the invention, transmit weight vectors can be initialized 530 as $$V_0 = \frac{1}{\sqrt{N_s}} \begin{bmatrix} I_{N_s} \\ 0_{(M_T - N_s) \times N_s} \end{bmatrix},$$

where $I_{N_s}$ is a $N_s \times N_s$ matrix of all zeros except for the diagonal elements which are one, and $0_{a \times b}$ is an a×b matrix of all zeros. Utilizing the iteration number t, the receive weight vectors $W_t$, are found 540 as $W_t = (HV_t V_t^H H^H +$ $\sigma_n^2 I_{M_R})^{-1} H V_t$, where $V_t$ are the transmit weight vectors at iteration number t, $\sigma_n^2$ is the noise power, and $I_{M_R}$ is a $M_R \times M_R$ matrix of all zeros except for the diagonal elements which are one. Again utilizing the iteration number t, the gradient matrix $G_t$, is found 550 as $G_t = (H^H W_t W_t^H H + 2\gamma (\text{trace}(V_t^H V_t) - 1) I_{M_T}) V_t - H^H W_t$, where $\gamma$ is the constraint weight (in one embodiment, $\gamma=1$), and $I_{M_T}$ is a $M_T \times M_T$ matrix of all zeros, except for the diagonal elements that are one. In another embodiment of the invention, the gradient matrix is: $G_t = (H^H W_t W_t^H H + \lambda_t I_{M_T}) V_t - H^H W_t$, the Lagrangian multiplier at iteration number t can be given as $\lambda_t = \lambda_{t-1} + \alpha g_{\lambda,t-1}$ and the Lagrangian gradient at iteration number t is: $g_{\lambda,t} = \text{trace}(V_t^H V_t - 1)$.

If the embodiment of the invention utilizes an adaptive step size 560, the step size $\alpha$, at iteration time t may be found 565 as the argument that minimizes the following objective function, $C(V_t, W_t, G_t, \gamma, \alpha)$ where $$C(V_t, W_t, G_t, \gamma, \alpha) = W_t^H H (V_t - \alpha G_t)^H H^H W_t - W_t^H (V_t - \alpha G_t) - (V_t - \alpha G_t)^H H^H W_t + \gamma \text{trace}((V_t - \alpha G_t)^H (V_t - \alpha G_t))$$

After a step size has been established, the transmit weight vectors can be computed 570 at iteration t+1 as a function of the transmit weight vectors at iteration number t, the step size at iteration number t, and the gradient matrix at iteration number t, using the equation $V_{t+1} = V_t - \alpha G_t$. In another embodiment of the invention, the Lagrangian multiplier may be updated with: $\lambda_{t+1} = \lambda_t + \alpha g_{\lambda,t}$. After computing the transmit weight vectors 570, the iteration number is incremented by one 575 as t=t+1. If the iteration number has reached an 'end' value 580, where $t_{end}$ is an integer designating the maximum number of iterations, then the receive weight vectors are the receive weight vectors at iteration number t, ($W=W_t$) 590 and the transmit weight vectors are the transmit weight vectors at iteration number t, ($V=V_t$) and this embodiment is completed. If the iteration number has not reached an 'end' value, 585 decides if trace($G_{t-1}^H G_{t-1}$) $<\epsilon$, and if yes, the receive weight vectors are chosen to be the receive weight vectors at iteration number t, ($W=W_t$) and the transmit weight vectors are chosen to be the transmit weight vectors at iteration number t, ($V=V_t$) 590 again completing this embodiment. For decision block 585, trace($G_{t-1}^H G_{t-1}$) $<\epsilon$ means the sum of the diagonal elements of the square matrix ($G_{t-1}^H G_{t-1}$) and where $\epsilon$ is a number indicating how small the gradient matrix at iteration number t should get. In other words, when trace($G_{t-1}^H G_{t-1}$)$<\epsilon$, the algorithm has almost converged because at the optimal solution $Gt_{t+1}=0$. If in decision block 585, trace($G_{t-1}^H G_{t-1}$)$<\epsilon$, is false, the process recedes to block 540 and the successive cancellation weights method continues until all values are satisfied by the techniques described within flow chart 500.

At this point the transmit vectors are, if necessary, renormalized to satisfy the constraint in Equation (2). An alternate embodiment of the invention is a closed form solution to the linear transmit and receive weights that has an equal Mean Squared Error (MSE) on each or the received data streams. At the receiver, an estimate, of the transmitted symbols, r, can be found by using a linear $M_R \times N_s$ weight matrix, W, as follows:

$$r = W^H y \tag{13}$$

An MMSE approach can be used to find W and V as summarized next where a closed form expression for W and V are given. Using the SVD, H can be expressed as follows:

$$H = U_H S_H Z_H^H \tag{14}$$

where $M_R \times M_R$ $U_H$ and $M_T \times M_T$ $Z_H$ are unitary matrices and $M_R \times M_T$ $S_H$ is a matrix of all zeros except for the upper left $r_H \times r_H$ portion which is:

$$[S_H]_{N_s} = \text{diag}(s_{H,1}, \ldots, s_{H,r_H}) \tag{15}$$

where $r_H$ is the rank of H ($r_H \leq \min(M_T, M_R)$), $[A]_l$ means the first l rows and columns of A, and it is assumed that $s_{H,1} \geq s_{H,2} \geq \ldots \geq s_{H,r_H}$. The transmit weight matrix can also be expressed by a SVD as follows:

$$V = U_V S_V Z_V^H \tag{16}$$

where $M_T \times M_T$ $U_V$ is unitary, $N_s \times N_s$ $Z_V$ is unitary, and $M_T \times N_s$ $S_V$ may be matrix of all zeros except for the upper $N_s \times N_s$ portion which contains the $N_s$ non-zero singular values of the transmit weight matrix as follows:

$$[S_V]_{N_s} = \text{diag}(s_{V,1}, \ldots, s_{V,N_s}) \tag{17}$$

One way to find the components of (16) may be to set $U_V = Z_H$ and the singular values can be found as the solution to:

$$s_{V,l}^2 = \frac{1}{\sqrt{\lambda}} \sigma_n s_{H,l}^{-1} - \sigma_n^2 s_{H,l}^{-2} \tag{18}$$

where $\lambda$ is chosen so that the following equation is satisfied (this forces the transmit weights to have unit power):

$$\sum_{l=1}^{N_s} s_{V,l}^2 = 1 \tag{19}$$

The MSE averaged across the data streams may be unchanged regardless of the choice of the right singular vectors of the transmit weight matrix. One option is to use the identity matrix (i.e., $Z_V = I$), however in general this choice gives unequal MSE on each data stream as will be seen. This means that the BER performance can be dominated by the data stream with the highest MSE. Thus if some unitary $Z_V$ can be found that gives equal MSE on each stream, the BER performance will improve while the average MSE will remain unchanged.

Using $U_V = Z_H$, the received data vector from (1) can be expressed as:

$$y = U_H S_H Z_H^H Z_H S_V Z_V^H x + n \tag{20}$$
$$= U_H S_H S_V Z_V^H x + n$$

Let $N_s \times 1$ $Y_{N_s} = \{U_H^H y\}_{N_s}$ where $\{a\}_i$ means the first i elements of the vector a, then $Y_{N_s}$ is:

$$Y_{N_s} = \{U_H^H U_H S_H S_V Z_V^H x + U_H^H n\}_{N_s} \tag{21}$$
$$= \{S_H S_V Z_V^H x\}_{N_s} + \{U_H^H n\}_{N_s}$$
$$= D Z_V^H x + N_{N_s}$$

where D is a real $N_s \times N_s$ diagonal matrix equal to diag($s_{H,1} s_{V,1}, \ldots, s_{H,N_s} s_{V,N_s}$) and $N_{N_s}$ has a covariance matrix equal to $\sigma_n^2 I_{N_s}$. (A unitary matrix times a vector of uncorrelated Gaussian random variables does not change its covariance matrix).

The MSE on stream l can be shown to be:

$$MSE_l = 1 - Z_{V,l}^H \tilde{D} Z_{V,l} \tag{22}$$

where $Z_{V,l}$ is the $l^{th}$ column of $Z_V$, and $$\tilde{D} = D^2 (D^2 + \sigma_n^2 I)^{-1} \tag{23}$$

Thus unless all of the diagonal elements of $\hat{D}$ are equal, using $Z_V = I$ gives unequal MSEs on each data stream. The MSE averaged across all streams can be shown to be:

$$\overline{MSE} = 1 - \text{trace}(\hat{D})/N_s \quad (24)$$

Therefore in order to make all data streams have the same MSE, $Z_{V,l}$ must satisfy:

$$Z_{V,l}^H \hat{D} Z_{V,l} = 1 - \overline{MSE} = \text{trace}(\hat{D})/N_s$$

subject to $Z_V Z_V^H = Z_V^H Z_V = I_{N_s}$ \quad (25)

One type of matrix that solves (25) is the DFT matrix (another choice for when $N_s$ is a power of four is the Hadamard matrix where the Hadamard matrix is known in the art). Thus the linear transmit weights that minimize the average MSE on the data streams and also have the same MSE on each stream are:

$$V = V_H S_V F_{N_s} \quad (26)$$

where $S_V$ is given by (17) and (18) and $F_{N_s}$ is the $N_s \times N_s$ DFT matrix normalized such that $F_{N_s}^H F_{N_s} = I$. With the transmit weights chosen according to (26), the $N_s$ streams can be recovered without any inter-stream interference as:

$$r = F_{N_s}^H D^{-1} Y_{N_s} \quad (27)$$

Figure 6:
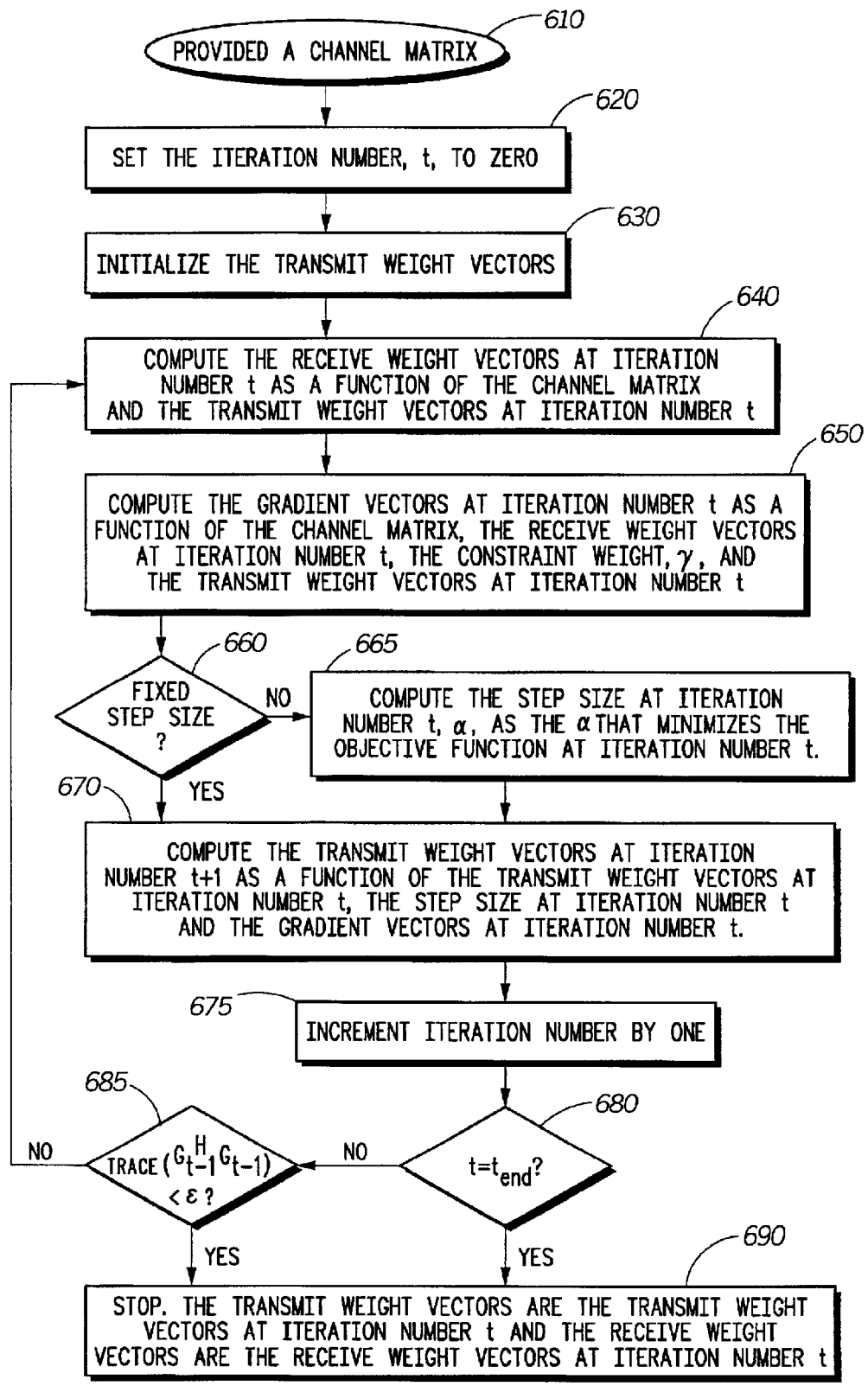
FIG. 6 is a flow chart representation of an alternative embodiment of a method performed by the antenna combiner of FIG. 3 and transmitting device of FIG. 3A, for finding the MMSE successive cancellation weights, in accordance with the invention.

Another embodiment of the invention provides an alternative approach to calculating transmit and receive weights for MIMO equal rate data streams and is illustrated as FIG. 6. The embodiment illustrated as flow chart 600, finds the successive cancellation weights that minimize the MSE between the estimated symbols and the true symbols on each stream. The advantage of successive cancellation weights over linear weights is that some of the receive array's degrees are freedom are recovered by sequentially subtracting out the estimated contribution from the decoded streams. For example if there are three streams and three receive antennas, when decoding the first stream, two degrees of freedom in the array are needed to null the other two streams. For the second stream, however, only one degree of freedom is needed to null the third stream since the decoded first stream is subtracted out. The extra degree of freedom then can be used in a max-ratio sense to provide an additional gain against noise. Finally, the third stream has all of the degrees of freedom in the array available to provide a gain against noise.

In one embodiment, for the successive cancellation method, the estimated symbols are given as:

$$r_u = w_u^H \left( y - \sum_{l=1}^{u-1} H v_l \hat{x}_l \right), \text{ where } \hat{x}_l = \text{slice}(r_l) \quad (28)$$

where in one embodiment slice($r_l$) means to choose the closest signal constellation point to $r_l$. In another embodiment, slice($r_l$) refers to any technique that involves decoding a plurality of received symbols $r_l$ into a bit stream, and then mapping the resulting bit stream to a signal constellation point.

The MMSE successive cancellation weights can be found as the solution to the following minimization problem:

$$\min_{w_u, v_u} \sum_{u=1}^{N_s} E|r_u - x_u|^2 = \min_{w_u, v_u} \sum_{u=1}^{N_s} E\left| w_u^H \left( \sum_{l=u}^{N_s} H v_l x_l + n \right) - x_u \right|^2 \quad (29)$$

Note that (29) differs from (4) due to the inner sum being performed from u to $N_s$ instead of 1 to $N_s$ as is done in (4). Using $E\{x_u(n) x_l^*(n)\} = \delta(u-l)$, (29) becomes:

$$\min_{w_u, v_u} \left\{ \sum_{u=1}^{N_s} w_u^H \left( \sum_{l=u}^{N_s} H v_l v_l^H H^H + \sigma_n^2 I_{M_R} \right) w_u - \sum_{u=1}^{N_s} w_u^H H v_u - \sum_{u=1}^{N_s} v_u^H H^H w_u + N_s \right\} \quad (30)$$

In addition to the minimization of the objective function in (30), the constraints on the transmit weight vectors given in (2) need to be met. One embodiment of the invention meets those constraints by modifying the objective function of (30) as follows:

$$\min_{w_u, v_u} \left\{ \sum_{u=1}^{N_s} w_u^H \left( \sum_{l=u}^{N_s} H v_l v_l^H H^H + \sigma_n^2 I_{M_R} \right) w_u - \sum_{u=1}^{N_s} w_u^H H v_u - \sum_{u=1}^{N_s} v_u^H H^H w_u + N_s + \gamma \left| \sum_{u=1}^{N} v_u^H v_u - 1 \right|^2 \right\} \quad (31)$$

where $\gamma$ is an arbitrary scaling placed on the constraint part of the objective function.

A closed form solution to (31) does not exist for $N_s > 1$, therefore a modified version of an iterative algorithm, such as a gradient-based optimization approach, is used to solve for $w_u$ and $v_u$. The gradient of (31) with respect to $w_u$ is:

$$\nabla w_u = \left( \sum_{l=u}^{N_s} H v_l v_l^H H^H + \sigma_n^2 I_{M_R} \right) w_u - H v_u \quad (32)$$

Equation (32) cannot be put into the same form as (8) because of the sum from u to $N_s$ in the parenthesis. Setting equation (32) equal to zero, $w_u$ can be found at each iteration as:

$$w_u = \left( \sum_{l=u}^{N_s} H v_l v_l^H H^H + \sigma_n^2 I_{M_R} \right)^{-1} H v_u \quad (33)$$

The gradient of (31) with respect to $v_u$ is:

$$\nabla v_u = \left( \sum_{l=1}^{u} H^H w_l w_l^H H + 2\gamma (\text{trace}(V^H V) - 1) I_{M_T} \right) v_u - H^H w_u \quad (34)$$

In another embodiment, the gradient is computed using Lagrangian multipliers as follows:

$$\nabla v_u = \left(\sum_{l=1}^{u} H^H w_l w_l^H H + \lambda I_{M_T}\right) v_u - H^H w_u \quad (35)$$

One addition gradient is needed, the Lagrangian gradient which is:

$$g_\lambda = \text{trace}(V^H V - 1) \quad (36)$$

The Lagrangian gradient is needed in order to update the Lagrangian multiplier, $\lambda$.

The method for calculating the successive cancellation weights is described in FIG. 6 as a flow chart representation 600 of a preferred embodiment of an alternative method performed by the antenna combiner of FIG. 3 and the transmit device of FIG. 3A, for finding the MMSE successive cancellation weights, in accordance with the invention. FIG. 6 begins by being provided 610 a channel matrix H that is a $M_R \times M_T$ matrix which contains the gain and phase between each transmit antenna ($M_T$ is the total number of transmit antennas) and each receive antenna ($M_R$ is the total number or receive antennas). The received vector, y, is modeled as $y(k) = HVx(k) + n(k)$, where for one embodiment of the invention, V is a $M_T \times N_s$ matrix of the transmit weight vectors, x(k) is a $N_s \times 1$ vector of the transmitted symbols at index (e.g., time or frequency), k, and n(k) is a $M_R \times 1$ vector of noise at index k. Because the total transmit power has to be limited, in one embodiment of the invention, the transmit weight vectors may be constrained as $\text{trace}(V^H V) = 1$, where trace (A) means to sum the diagonal elements of the matrix A, and superscript H means the conjugate transpose (also known as the Hermitian) of the matrix.

An additional embodiment of the invention finds receive weight vectors which are the columns of the receive weight matrix, W, that can be used to find an estimate, r(k), of x(k) as $$r_u(k) = w_u^H \left( y(k) - \sum_{l=1}^{u-1} H v_l \hat{x}_l(k) \right),$$

where $\hat{x}_l(k) = \text{slice}(r_l(k))$ and $r_u(k)$ is the $u^{th}$ element of r(k) slice($r_l(k)$) may mean to choose the closest signal constellation point to $r_l(k)$.

In another embodiment of the invention, the method of FIG. 6 can initialize an iteration number t, to zero 620, and the transmit weight vectors 630 may be initialized as $$V_0 = \frac{1}{\sqrt{N_s}} \begin{bmatrix} I_{N_s} \\ 0_{(M_T - N_s) \times N_s} \end{bmatrix},$$

where $I_{N_s}$ is a $N_s \times N_s$ matrix of all zeros except for the diagonal elements which are one, and $0_{a \times b}$ is an a×b matrix of all zeros. With the initialization complete, the method of FIG. 6 computes the receive weight vectors $W_t$ at iteration number t 640, are found, for u=1 to $N_s$, as $$w_{t,u} = \left( \sum_{l=u}^{N_s} H v_{t,l} v_{t,l}^H H^H + \sigma_n^2 I_{M_R} \right)^{-1} H v_{t,u}$$

where $w_{t,u}$ is the $u^{th}$ column of $W_t$, $v_{t,u}$ are the transmit weight vectors at iteration number t, $\sigma_n^2$ is the noise power, and $I_{M_R}$ is a $M_R \times M_R$ matrix of all zeros except for the diagonal elements which are one.

Flow chart 600 proceeds to compute the gradient vectors at iteration number t 650. The gradient vectors, $g_{t,u}$, are found using the equation $$g_{t,u} = \left( \sum_{l=1}^{u} H^H w_{t,l} w_{t,l}^H H + 2\gamma(\text{trace}(V_t^H V_t) - 1) I_{M_T} \right) v_{t,u} - H^H w_{t,u},$$

where $\gamma$ can be the constraint weight (in one embodiment of the invention, $\gamma=1$), and $I_{M_T}$ is a $M_T \times M_T$ matrix of all zeros, except for the diagonal elements which are one. In another embodiment of the invention, the gradient vectors may be found according to:

$$g_{t,u} = \left( \sum_{l=1}^{u} H^H w_{t,l} w_{t,l}^H H + \lambda_t I_{M_T} \right) v_{t,u} - H^H w_{t,u}.$$

It is by computing the gradient vectors, $g_{t,u}$, instead of the gradient matrix, $G_t$, that distinguishes the successive cancellation weights method of FIG. 6 from the linear MMSE weights method of FIG. 5.

If a step size has not been calculated prior to 660, the step size $\alpha$, at iteration time t may be found 665 as the argument that minimizes the following objective function, $C(V_t, W_t, G_t, \gamma, \alpha)$ where $$C(V_t, W_t, G_t, \gamma, \alpha) =$$

$$\left\{ \begin{array}{l} \sum_{u=1}^{N_s} w_{t,u}^H \left( \sum_{l=u}^{N_s} H(v_{t,u} - \alpha g_{t,u})(v_{t,u} - \alpha g_{t,u})^H H^H + \sigma_n^2 I_{M_R} \right) w_{t,u} - \\ \sum_{u=1}^{N_s} w_{t,u}^H H(v_{t,u} - \alpha g_{t,u}) - \sum_{u=1}^{N_s} (v_{t,u} - \alpha g_{t,u})^H H^H w_{t,u} + N_s + \\ \gamma \left| \sum_{u=1}^{N_s} (v_{t,u} - \alpha g_{t,u})^H (v_{t,u} - \alpha g_{t,u}) - 1 \right|^2 \end{array} \right\}.$$

After a step size has been established, the transmit weight vectors are computed 670 at iteration t+1 as a function of the transmit weight vectors at iteration number t, the step size at iteration number t, and the gradient vectors at iteration number t, using the equation $v_{t+1,u} = v_{t,u} - \alpha g_{t,u}$, where u=1 to $N_s$. In another embodiment of the invention, the Lagrangian multiplier is updated with: $\lambda_{t+1} = \lambda_t + \alpha g_{\lambda,t}$.

After computing the transmit weight vectors 670, the iteration number may be incremented by one 675 as t=t+1. If the iteration number has reached an 'end' value 680, where $t_{end}$ is an integer designating the maximum number of iterations, then the receive weight vectors may be chosen to be the receive weight vectors at iteration number t, (W=$W_t$) and the transmit weight vectors may be chosen to be the transmit weight vectors at iteration number t, (V=$V_t$) 690 completing this embodiment. If the iteration number has not reached an 'end' value, 685 decides if trace($G_{t-1}^H G_{t-1}$)<$\epsilon$, and if yes, the receive weight vectors are the receive weight vectors at iteration number t, (W=$W_t$) and the transmit weight vectors are the transmit weight vectors at iteration number t, (V=$V_t$) 690 again completing this embodiment. For decision block 685, trace($G_{t-1}^H G_{t-1}$)<$\epsilon$ means the sum of the diagonal elements of the square matrix ($G_{t-1}^H G_{t-1}$) and where $\epsilon$ is a number indicating how small the gradient matrix at iteration number t should get. In other words, when trace($G_{t-1}^H G_{t-1}$)<$\epsilon$, the algorithm has almost converged because at the optimal solution, $G_{t-1}=0$. If in decision block 685, trace($G_{t-1}^H G_{t-1}$)<$\epsilon$, is false, the process recedes to block 640 and the successive cancellation weights method continues until all values are satisfied by the techniques described within flow chart 600. At this point the transmit vectors may be renormalized, if necessary, to satisfy the constraint in Equation (2).

Figure 7:
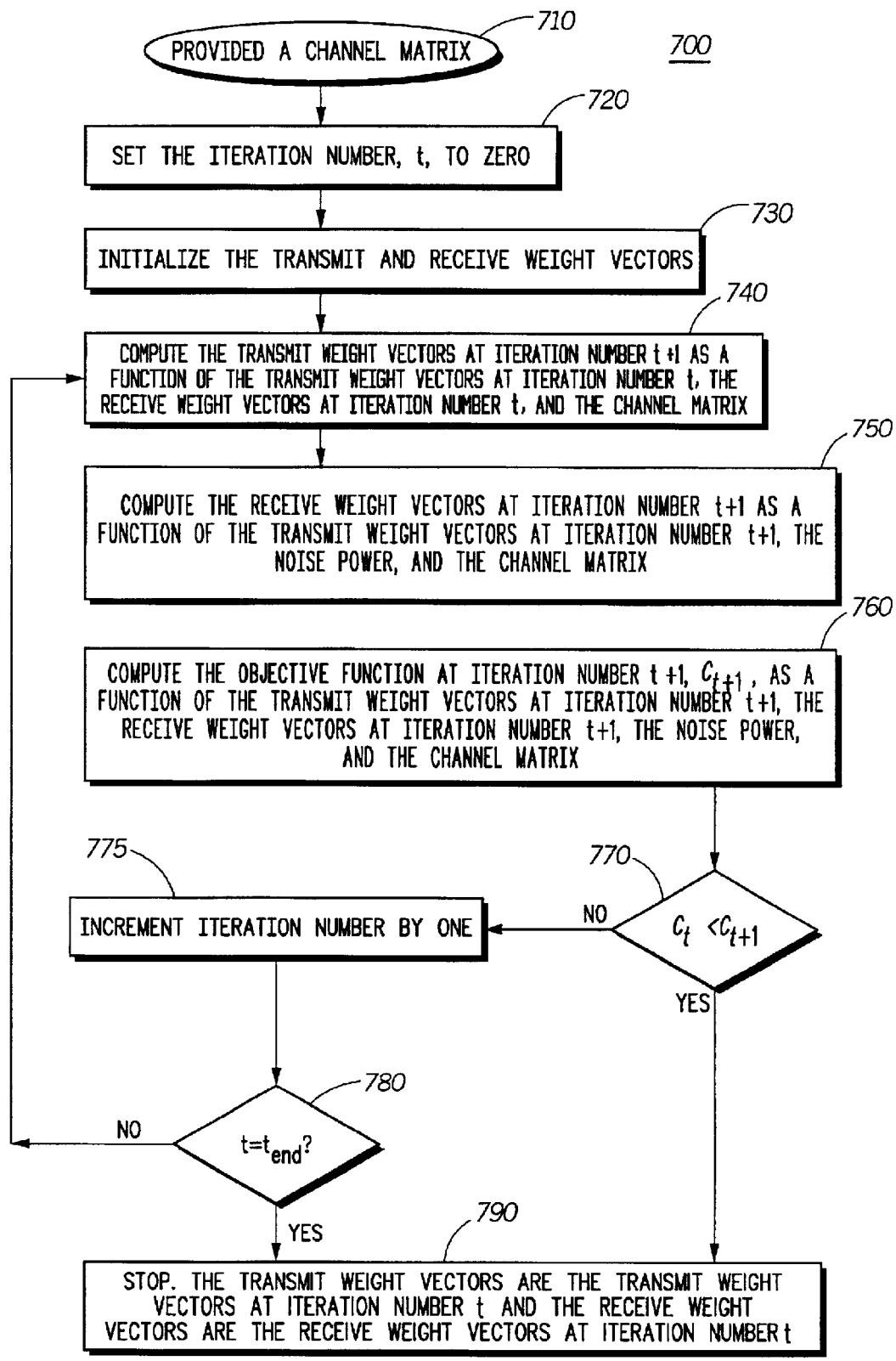
FIG. 7 is a flow chart representation of an alternative embodiment of a method performed by the antenna combiner of FIG. 3 and transmitting device of FIG. 3A, for finding the MMSE successive cancellation weights, in accordance with the invention.

FIG. 7 shows a flowchart of another embodiment of the invention 700. In this embodiment the gradient matrix or vectors may never be calculated, but the transmit and receive linear and successive cancellation weights can be found through means of iteration. Initially, 710 one embodiment of the invention may be provided a channel matrix. The iteration number, t 720, may next be set to 0 and the transmit and receive vectors can be initialized 730. In one embodiment of the invention, the transmit and receive vectors can be initialized to:

$$V_0 = \frac{1}{\sqrt{N_s}} \begin{bmatrix} I_{N_s} \\ 0_{(M_T - N_s) \times N_s} \end{bmatrix}$$

For the linear weights, the receive weights are initialized to:

$$W_0 = (HV_0 V_0^H H + \sigma_n^2 I_{M_R})^{-1} HV_0$$

For the successive cancellation weights, the receive weights are initialized to:

$$w_{0,u} = \left( \sum_{l=u}^{N_s} Hv_{0,l} v_{0,l}^H H^H + \sigma_n^2 I_{M_R} \right)^{-1} Hv_{0,u}$$

Additionally the objective function at iteration 0, $C_0$, is set to an arbitrary large number. (In one embodiment $C_0 = \infty$.)

The transmit weight vectors at iteration number t+1 may next be computed 740 as a function of the transmit weight vectors at time t, the receive weight vectors at iteration number t, and the channel matrix as follows (where $\gamma$ is the constraint weight):

For the linear weights:

$$V_{t+1} = (H^H W_t W_t^H H + 2\gamma(\text{trace}(V_t^H V_t) - 1) I_{M_T})^{-1} H^H W_t$$

For the successive cancellation weights:

$$v_{t+1,u} = \left( \sum_{l=1}^{u} H^H w_{t,l} w_{t,l}^H H + 2\gamma(\text{trace}(V_t^H V_t) - 1) I_{M_T} \right)^{-1} H^H w_{t,u}$$

Next, the receive weight vectors at iteration t+1 may be computed as a function of the transmit weight vectors 750 at iteration number t+1, the noise power, and the channel matrix as follows:

For the linear weights:

$$W_t = (HV_t V_t^H H + \sigma_n^2 I_{M_R})^{-1} HV_t$$

For the successive cancellation weights:

$$w_{t,u} = \left( \sum_{l=u}^{N_s} Hv_{t,l} v_{t,l}^H H^H + \sigma_n^2 I_{M_R} \right)^{-1} Hv_{t,u}$$

The objective function at iteration number t+1 may next be computed 760 as a function of the transmit and receive weight vectors at iteration number t+1, the noise power, and the channel matrix as follows:

For the linear weights:

$$C_{t+1} = N_s + W_{t+1}^H (V_{t+1})(V_{t+1})^H H^H W_{t+1} - W_{t+1}^H H(V_{t+1}) - (V_{t+1})^H H^H W_{t+1} + \gamma \text{trace}((V_{t+1})^H (V_{t+1}))$$

For the successive cancellation weights:

$$C_{t+1} = \left\{ \begin{array}{l} \sum_{u=1}^{N_s} w_{t+1,u}^H \left( \sum_{l=u}^{N_s} H(v_{t+1,u})(v_{t+1,u})^H H^H + \sigma_n^2 I_{M_R} \right) w_{t+1,u} - \\ \sum_{u=1}^{N_s} w_{t+1,u}^H H(v_{t+1,u}) - \sum_{u=1}^{N_s} (v_{t+1,u})^H H^H w_{t+1,u} + N_s + \\ \gamma \left| \sum_{u=1}^{N_s} (v_{t+1,u})^H (v_{t+1,u}) - 1 \right|^2 \end{array} \right\}$$

Next, 770 if the objective function at iteration t is less than the objective function at iteration t+1, then the receive weight vectors may be the receive weight vectors at iteration number t, ($W=W_t$) and the transmit weight vectors may be the transmit weight vectors at iteration number t, ($V=V_t$) 790 completing this embodiment. If the objective function at iteration t is not less than the objective function at iteration t+1, then in 775 the iteration number, t, can be incremented by one. If the iteration number has reached an 'end' value 780, where $t_{end}$ may be an integer designating the maximum number of iterations, then the receive weight vectors may be chosen to be the receive weight vectors at iteration number t, ($W=W_t$) and the transmit weight vectors may be chosen to be the transmit weight vectors at iteration number t, ($V=V_t$) 790 completing this embodiment. If the end value is not reached, then the iterative procedure returns back to 740 and performs another iteration. After the iterations are completed, the transmit vectors may need to be renormalized to meet the constraint in Equation (2).

A further embodiment of the invention may provide for the successive cancellation weights to find weights that maximize the theoretical capacity as described next. The capacity of the channel for a given transmit weight matrix, V, can be shown to be:

$$C = \log_2 \left[ \det \left( I + \frac{1}{\sigma_n^2} HVV^H H^H \right) \right] \quad (37)$$

Using (14) and (16), the capacity equation in (37) becomes:

$$C = \log_2 \left[ \det \left( I + \frac{1}{\sigma_n^2} U_H S_H Z_H^H U_V S_V Z_V^H Z_V S_V^T U_V^H Z_H S_H^T U_H^H \right) \right] \quad (38)$$

Using $Z_V^H Z_V = I$ and making $U_V = Z_H$, (38) becomes:

$$C = \log_2 \left[ \det \left( I + \frac{1}{\sigma_n^2} U_H S_H S_V S_V^T S_H^T U_H^H \right) \right] \quad (39)$$

In other words, the capacity is independent of the right singular vectors of the transmit weight matrix. However, even though the capacity is not affected by $Z_V$, different $Z_V$'s will greatly affect the performance of a practical receiver depending on what type of receive algorithm is employed (e.g., successive cancellation or linear weights). Therefore a search can be performed only over $Z_V$ and the resulting weights will not change the theoretical capacity but will improve the receiver performance given the algorithm employed.

To maximize the capacity, the r ($r \neq N_s$ in general) singular values for the transmit weight vectors are selected according to the water-pouring strategy as known in the art with a total transmit power of one (this enforces the constraint trace $(V^H V)=1$). If the water-pouring strategy says to transmit on more streams than $N_s$, then the singular values of the transmit weight vectors are selected according to the water-pouring strategy using only the largest $N_s$ singular values of H.

To summarize, the transmit weights are expressed as:

$$V = Z_H S_V Z_V^H \quad (40)$$

Therefore the received data vector can be expressed as:

$$y = U_H S_H Z_H^H Z_H S_V Z_V^H x + n = U_H S_H S_V Z_V^H x + n \quad (41)$$

Let $r \times 1$ $Y_r = \{U_H^H y\}_r$ where $\{a\}_i$ means the first i elements of the vector a, then $Y_r$ is:

$$Y_r = \{U_H^H U_H S_H S_V Z_V^H x + U_H^H n\}_r \quad (42)$$
$$= \{S_H S_V Z_V^H x\}_r + \{U_H^H n\}_r = D Z_V^H x + N_r$$

where the diagonalized channel, D, is a real r×r diagonal matrix equal to $\mathrm{diag}(s_{H,1} s_{V,1}, \ldots, s_{H,r} s_{V,r})$ and $N_r$ has a covariance matrix equal to $\sigma_n^2 I_r$. Note that $s_{H,r} \neq 0$ because the water-pouring strategy would never dictate sending power on a stream with a singular value of zero.

For the Successive Cancellation MMSE weights, in order to maximize the capacity, r must equal the number of streams that the water-pouring strategy dictates and r must be less than or equal to $N_s$. Assuming this is true (i.e., $r \leq N_s$), the Successive Cancellation MMSE weights that maximize capacity are found by solving:

$$\min_{W,T} \sum_{l=1}^{N_s} E \left| w_l^H \left( Y_r - D \sum_{p=1}^{l-1} t_p + x_p \right) - x_l \right|^2 = \quad (43)$$

$$\min_{W,T} \sum_{l=1}^{N_s} E \left| w_l^H \left( D \sum_{p=1}^{N_s} t_p x_p + N_r \right) - x_l \right|$$

subject to: $TT^H = I$ where the r×$N_s$ right singular matrix, T, is $T = [t_1, \ldots, t_{N_s}]$, $t_1$ through $t_{N_s}$ are the right singular vectors, $T = Z_V^H$, and $M_R \times N_s$ $W = [w_1, \ldots w_{N_s}]$.

It can be shown that the receive weight vector for stream l is given by:

$$w_l = \left( D \sum_{p=l}^{N_s} t_p t_p^H D + \sigma_n^2 I_r \right)^{-1} D t_l \quad (44)$$

Ignoring the constraint for now, the gradient of the objective function in (44) with respect to $t_l$ (the $l^{th}$ column of T) can be shown to be:

$$\nabla t_l = D \sum_{p=1}^{l} w_p w_p^H D t_l - D w_l \quad (45)$$

Using (45), T can be found through a gradient search where the constraint of $TT^H = I$ is enforced at each step. This procedure is described in a flow chart representation 900 of a preferred embodiment of the invention illustrated in FIG. 8.

Figure 8:
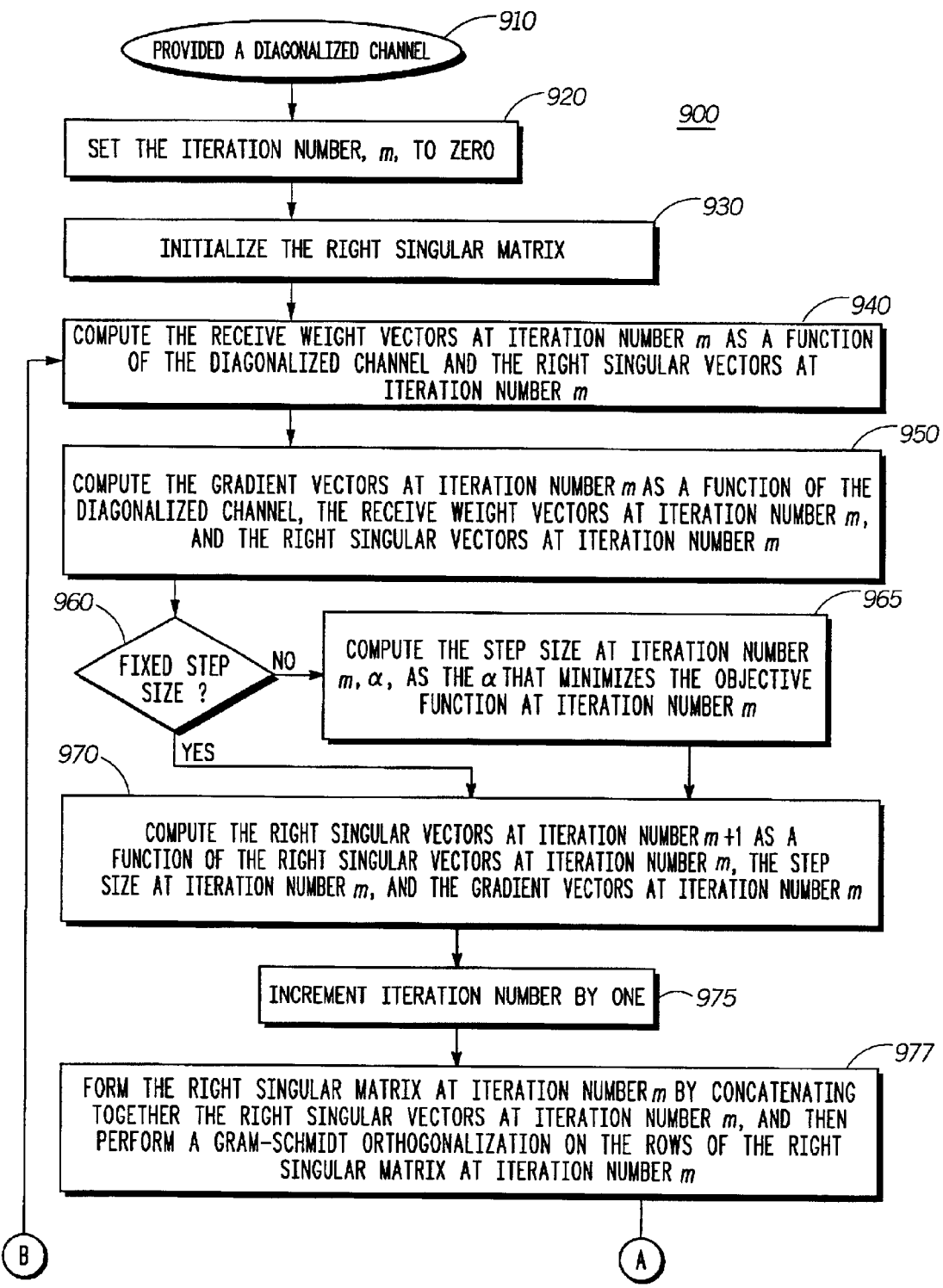
FIG. 8 is a flow chart representation of an alternative embodiment of a method performed by the antenna combiner of FIG. 3 and transmitting device of FIG. 3A, for finding the MMSE successive cancellation weights, in accordance with the invention.

The embodiment of the invention illustrated in FIG. 8 may be provided a channel matrix, H (910). Next the iteration number, m, can be set to 0 (920). The right singular matrix at iteration number 0, $T_0$, may next be initialized by choosing any arbitrary r×$N_s$ matrix such that $T_0 T_0^H = I$ (930). Next, the receive weight vectors at iteration number m, $w_{m,l}$, can be computed as a function of the diagonalized channel, D, and the right singular vectors at iteration number m, $t_{m,l}$, (940) as $$w_{m,l} = \left( D \sum_{p=l}^{N_s} t_{m,p} t_{m,p}^H D + \sigma_n^2 I \right)^{-1} D t_{m,l}$$

for $l=1, \ldots, N_s$. Then the gradient vectors at iteration number m, $g_{m,l}$, may be computed as a function of the diagonalized channel, the receive weight vectors at iteration number m, and the right singular vectors at iteration number m (950) as $$g_{m,l} = D \sum_{p=1}^{l} w_{m,p} w_{m,p}^H D t_{m,l} - D w_{m,l}$$

for $l=1, \ldots, N_s$. If a step size, $\alpha$, has not been calculated prior to (960) then a step size can be calculated that will minimize the objective function in (43) subject to $T_m T_m^H = I$ (965). The next step may compute the right singular vectors at iteration number m+1 as a function of the right singular vectors at iteration number m, the step size at iteration number m, and the gradient vectors at iteration number m (970) as $t_{m,l} = t_{m,l} - \alpha g_{m,l}$ for $l=1, \ldots, N_s$. The iteration number may then be incremented by one (975) as m=m+1. Then (977) the right singular matrix at iteration number m, $T_m$, is formed by concatenating the right singular vectors at iteration number m together ($T_m = [t_{m,1}, \ldots, t_{m,N_s}]$) and a Gram-Schmidt orthogonalization (as known in the art) can be performed on the rows of the right singular matrix at iteration number m (this enforces the constraint $T_m T_m^H = I$). The flow chart representation 900 continues as an embodiment of the invention in FIG. 8A.

Figure 8A:
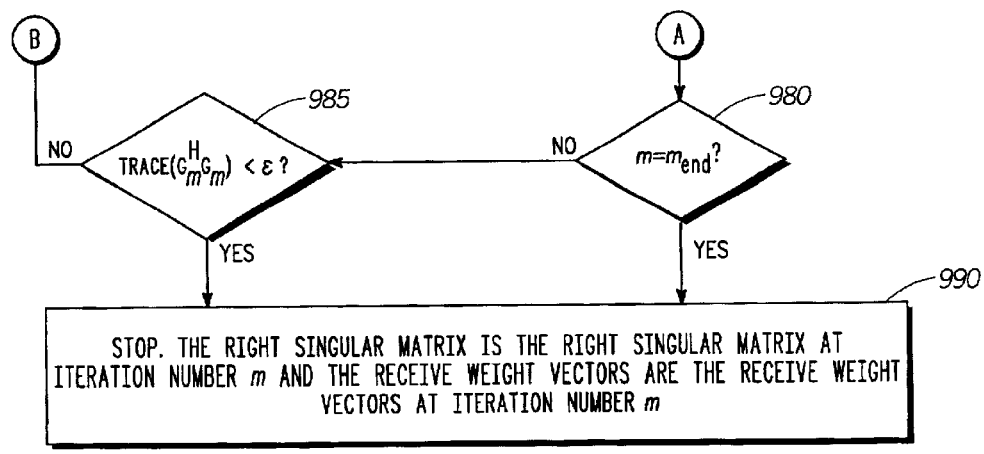
FIG. 8A is a flow chart representation of an embodiment for the method of FIG. 8 as performed by the antenna combiner of FIG. 3 and transmitting device of FIG. 3A.

In FIG. 8A, if the iteration number has reached an 'end' value 980, where $m_{end}$ may be an integer designating the maximum number of iterations, then the right singular matrix may be the right singular matrix at iteration number m, ($T = T_m$) and the receive weight vectors may be chosen to be the receive weight vectors at iteration number m, ($w_l = w_{m,l}$) 990 completing this embodiment. If the iteration number has not reached an 'end' value, block 985 can decide if trace($G_m^H G_m$)<$\epsilon$ where $G_m = [g_{m,1}, \ldots, g_{m,N_s}]$, and if yes, the receive weight vectors are chosen to be the receive weight vectors at iteration number m, ($w_l = w_{m,l}$) and the right singular matrix is chosen to be the right singular matrix at iteration number m, ($T = T_m$) 990 again completing this embodiment. For decision block 985, trace($G_m^H G_m$) means the sum of the diagonal elements of the square matrix ($G_m^H G_m$) and where $\epsilon$ is a number indicating how small the gradient matrix at iteration number m should get. In other words, when trace($G_m^H G_m$)<$\epsilon$, the algorithm has almost converged because at the optimal solution, $G_m = 0$. If in decision block 985, trace($G_m^H G_m$)<$\epsilon$, is false, the process recedes to block 940 of FIG. 8, and the successive cancellation weights method continues until all values are satisfied by the techniques described within flow chart 900. After completion of the technique described within flow chart 900, the transmit weight vectors may be given as $V = Z_H S_V T$.

The present invention may be embodied in other specific forms without departing from its spirit or essential characteristics. The described embodiments are to be considered in all respects only as illustrative and not restrictive.

What is claimed is:

1. A method of operating a communication system, the method comprising the steps of:
   providing a channel matrix of a gain and phase between each transmit antenna and each receive antenna of the communication system;
   computing at least one receive weight vector as a function of the channel matrix and at least one transmit weight vector;
   computing a gradient matrix as a function of the transmit weight vector, the channel matrix, the receive weight vector and a constraint weight; and
   computing an updated transmit weight vector as a function of the transmit weight vector, the receive weight vector, the gradient matrix, and the channel matrix.

2. The method of claim 1 wherein the transmit weight vector is computed as a function of a step size.

3. The method of claim 1 wherein the updated transmit weight vector is computed according to:

$$\min_{w_u, v_u} \sum_{u=1}^{N_S} E|r_u - x_u|^2 = \min_{w_u, v_u} \sum_{u=1}^{N_S} E\left|w_u^H\left(\sum_{l=1}^{N_S} Hv_l x_l + n\right) - x_u\right|^2,$$

where $r_u$ is the $u^{th}$ element of r and $x_u$ is $u^{th}$ element of x.

4. The method of claim 1 wherein each column of the gradient matrix is computed according to:

$$G = (H^H W W^H H + 2\gamma(\text{trace}(V^H V) - 1)I_{M_T})V - H^H W.$$

5. The method of claim 1 wherein the updated transmit weight vector is computed according to:

$$\min_{w_u, v_u} \sum_{u=1}^{N_S} E|r_u - x_u|^2 = \min_{w_u, v_u} \sum_{u=1}^{N_S} E\left|w_u^H\left(\sum_{l=u}^{N_S} Hv_l x_l + n\right) - x_u\right|^2,$$

where $r_u$ is the $u^{th}$ element of r and $x_u$ is $u^{th}$ element of x.

6. The method of claim 1 wherein each column of the gradient matrix is computed according to:

$$\nabla v_u = \left(\sum_{l=1}^{u} H^H w_l w_l^H H + 2\gamma(\text{trace}(V^H V) - 1)I_{M_T}\right)v_u - H^H w_u,$$

where u designates a column of the gradient vector.

7. A system for operating a communication system comprising:
   means for providing a channel matrix of a gain and phase between each transmit antenna and each receive antenna of the communication system;
   means for computing at least one receive weight vector as a function of the channel matrix and at least one of transmit weight vectors; and
   means for computing a gradient matrix as a function of the channel matrix, the receive weight vector, the transmit weight vector and a constraint weight; and
   means for computing an updated transmit weight vector as a function of the transmit weight vector, the channel matrix, the gradient matrix, and the receive weight vector.

8. The system of claim 7 further comprising means for computing the transmit weight vector as a function of a step size.

9. A computer readable medium storing a computer program comprising:
   computer readable code for providing a channel matrix of a gain and phase between each transmit antenna end each receive antenna of the communication system;
   computer readable code for computing at least one receive weight vector as a function of the channel matrix and at least one of transmit weight vectors;
   computer readable code for computing a gradient matrix as a function of the channel matrix, the receive weight vector and the transmit weight vector; and
   computer readable code for computing an updated transmit weight vector as a function of the transmit weight vector and the gradient matrix.

10. The program of claim 9 further comprising computer readable code for computing a gradient matrix as a function of the transmit weight vector, the channel matrix, the receive weight vector and a constraint weight, computing the updated transmit weight vector as a function of the gradient matrix and the transmit weight vector.

11. The program of claim 9 further comprising computer readable code for computing the transmit weight vector as a function of a step size.

12. The method of claim 9 wherein the updated transmit weight vector is computed according to:

$$\min_{w_u, v_u} \sum_{u=1}^{N_S} E|r_u - x_u|^2 = \min_{w_u, v_u} \sum_{u=1}^{N_S} E\left|w_u^H\left(\sum_{l=1}^{N_S} Hv_l x_l + n\right) - x_u\right|^2,$$

where $r_u$ is the $u^{th}$ element of r and $x_u$ is $u^{th}$ element of x.

13. The method of claim 9 wherein each column of the gradient matrix is computed according to:

$$G = (H^H W W^H H + 2\gamma(\text{trace}(V^H V) - 1)I_{M_T})V - H^H W.$$

14. The method of claim 9 wherein the updated transmit weight vector is computed according to:

$$\min_{w_u, v_u} \sum_{u=1}^{N_S} E|r_u - x_u|^2 = \min_{w_u, v_u} \sum_{u=1}^{N_S} E\left|w_u^H\left(\sum_{l=u}^{N_S} Hv_l x_l + n\right) - x_u\right|^2,$$

where $r_u$ is the $u^{th}$ element of r and $x_u$ is $u^{th}$ element of x.

15. The method of claim 9 wherein each column of the gradient matrix is computed according to:

$$\nabla v_u = \left(\sum_{l=1}^{u} H^H w_l w_l^H H + 2\gamma(\text{trace}(V^H V) - 1)I_{M_T}\right)v_u - H^H w_u,$$

where u designates a column of the gradient vector.

16. A method of operating a communication system, the method comprising the steps of:
   computing a plurality of transmit weight vectors and a plurality of receive weight vectors that minimizes an expected mean squared error between analytical successive cancellation symbol estimates and transmitted symbols, wherein each analytical successive cancellation symbol estimate is computed according to $$r_u = w_u^H \left( y - \sum_{l=1}^{u-1} Hv_l \hat{x}_l \right),$$

where $\hat{x}_l$=slice($r_l$); and utilizing the transmit and receive weight vectors in transmitting and receiving signals.

17. The method of claim 16 wherein the transmit weight vector is normalized according to;

trace($V^H V$)=1.

18. A method of operating a communication system, the method comprising the steps of:

computing a plurality of transmit weight vectors wherein the transmit weight vectors are computed according to:

$$V = U_V S_V Z_V^H$$

where $U_V = Z_H$ and $Z_V$ is chosen according to:

$Z_{V,l}^H \hat{D} Z_{V,l} = 1 - \overline{\text{MSE}} = \text{trace}(\hat{D})/N_s$; and subject to $Z_V Z_V^H = Z_V^H Z_V = I_{N_s}$ utilizing the plurality of transmit weight vectors to transmit signals.

19. The method of claim 18 wherein the right singular vectors of the transmit weight matrix are the columns of the normalized DFT matrix.

20. The method of claim 18 wherein the right singular vectors of the transmit weight matrix are the columns of the normalized Hadamard matrix.

* * * * *